SPIN ECHO MEMORY TECHNIQUE AND APPARATUS

Filed July 15, 1955 3 Sheets-Sheet 1

INVENTOR.
Richard L. Garwin
BY
Van Deventer & Shively
ATTORNEYS

SPIN ECHO MEMORY TECHNIQUE AND APPARATUS

Filed July 15, 1955 3 Sheets-Sheet 2

INVENTOR.
Richard L. Garwin
BY
Van Deventer & Shively
ATTORNEYS

SPIN ECHO MEMORY TECHNIQUE AND APPARATUS

Filed July 15, 1955 3 Sheets-Sheet 3

INVENTOR.
Richard L. Garwin
BY
Van Deventer & Shively
ATTORNEYS

United States Patent Office 2,810,108

Patented Oct. 15, 1957

2,810,108

SPIN ECHO MEMORY TECHNIQUE AND APPARATUS

Richard L. Garwin, Scarsdale, N. Y., assignor to International Business Machines Corporation, a corporation of New York Application July 15, 1955, Serial No. 522,291

6 Claims. (Cl. 324—.5)

The present invention pertains to improvements in spin echo memory technique and apparatus.

An object of the invention is to provide a spin echo method of information storage and recovery in which the echo signalling coincidence of groups of gyromagnetic bodies is brought about by reversing the pattern of relative field inhomogeneities affecting the bodies of each group.

A further object is to provide a spin echo method of the above nature in which the necessity for radio-frequency recollection pulses may be eliminated.

Another object is to provide a method of the above type whereby the echo output may be brought about at any desired point within the memory period of the storage medium.

A further object is to provide a method by which the inter-pulse spacing of the echo train may be selectively altered from that of the entered information pulse train.

A further object is to provide suitable apparatus for carrying out the method. Other objects and advantages of the invention will become evident during the course of the following description in connection with the accompanying drawings, in which Figures 1 and 2 are electrical diagrams jointly illustrative of typical apparatus for carrying out the invention; Figures 3, (A), (B), (C), (D), ($D_1$), and (E) comprise a series of related geometric diagrams illustrating the behavior of a typical group of magnetic moments in forming a spin echo by the control procedure of the prior art;

Figures 4, (A), (B) and (C) present a similar series of diagrams illustrating the new procedure introduced by the method of the present invention;

Figure 1:
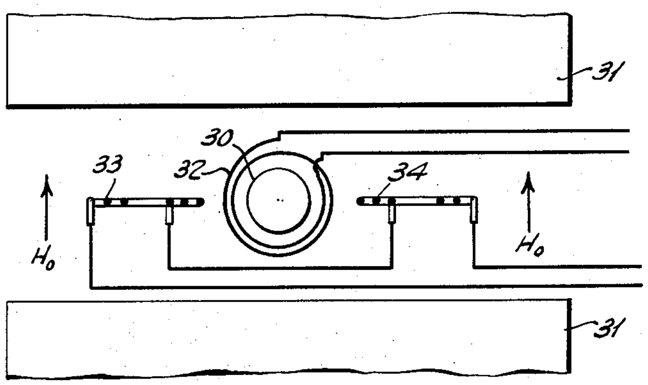

Spin-echo technique, based generally on the behavior of spinning gyroscopic particles in aligning or polarizing fields, may best be illustrated as applied to atomic nuclei affected by a strong magnetic field and producing the desired echo effects due to free nuclear induction. The phenomenon of nuclear induction per se has been set forth in U. S. Patent No. 2,561,489 to F. Bloch et al., as well as in various well-known scientific publications by Bloch and by Purcell. The extension of the effect to produce spin-echoes, the work of E. L. Hahn, was described by the latter scientist in an article entitled "Spin Echoes," published in Physical Review, Nov. 15, 1950. As the above publications are readily available in the public domain, repetition herein of the entire complex mathematical analysis contained in them is obviously unnecessary. However, in order to set forth most clearly the nature and advantages of the present invention, it is appropriate first to describe briefly the pertinent general principles of spin echo technique.

Nuclear induction, while in itself a magnetic effect, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin about its own axis of symmetry, and as the nucleus has mass, it possesses angular momentum of spin and accordingly comprises a gyroscope, infinitesimal, but nevertheless having the normal mechanical properties of this type of device. In addition, the nucleus possesses a magnetic moment directed along its gyroscopic axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyromagnetic ratio, and is normally designated by the Greek letter $\gamma$.

A small sample of chemical substance, such as water as previously noted, obviously contains a vast number of such gyroscopic nuclei. If the sample is placed in a strong unidirectional magnetic field these spinning nuclei align themselves with their magnetic axes parallel to the field, after the manner of a large gyroscope standing erect in the earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular momentum $I_0$, which two quantities may be represented as the vector sums of the magnetic moments and spins of all the nuclei concerned.

So long as the sample remains undisturbed in the field, the gyroscopic nuclei remain in parallel alignment therewith as noted. If, however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0=\gamma H_0$, where $H_0$ is the field strength affecting each nucleus and $\gamma$ is the previously noted gyromagnetic ratio. This precessional frequency $\omega_0$ is termed the Larmor frequency, and since for any given type of nuclei $\gamma$ is a constant (for example $2.68\times10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments precessing at differing Larmor frequencies.

It is upon the above described characteristic of differential precession in an inhomogeneous field that the technique of spin-echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electromagnetic equivalent. The main magnetic field $H_0$ exists in the vertical direction, while a radio-frequency coil 32 is arranged to supply a field with its axis into or out of the paper of the diagram, the R. F. field thus being perpendicular to the $H_0$ field. A pair of flat direct current coils 33 and 34, arranged as shown diagrammatically with respect to the magnet 31 and R. F. coil 32, are provided to introduce field inhomogeneities as hereinafter set forth.

Figure 2:
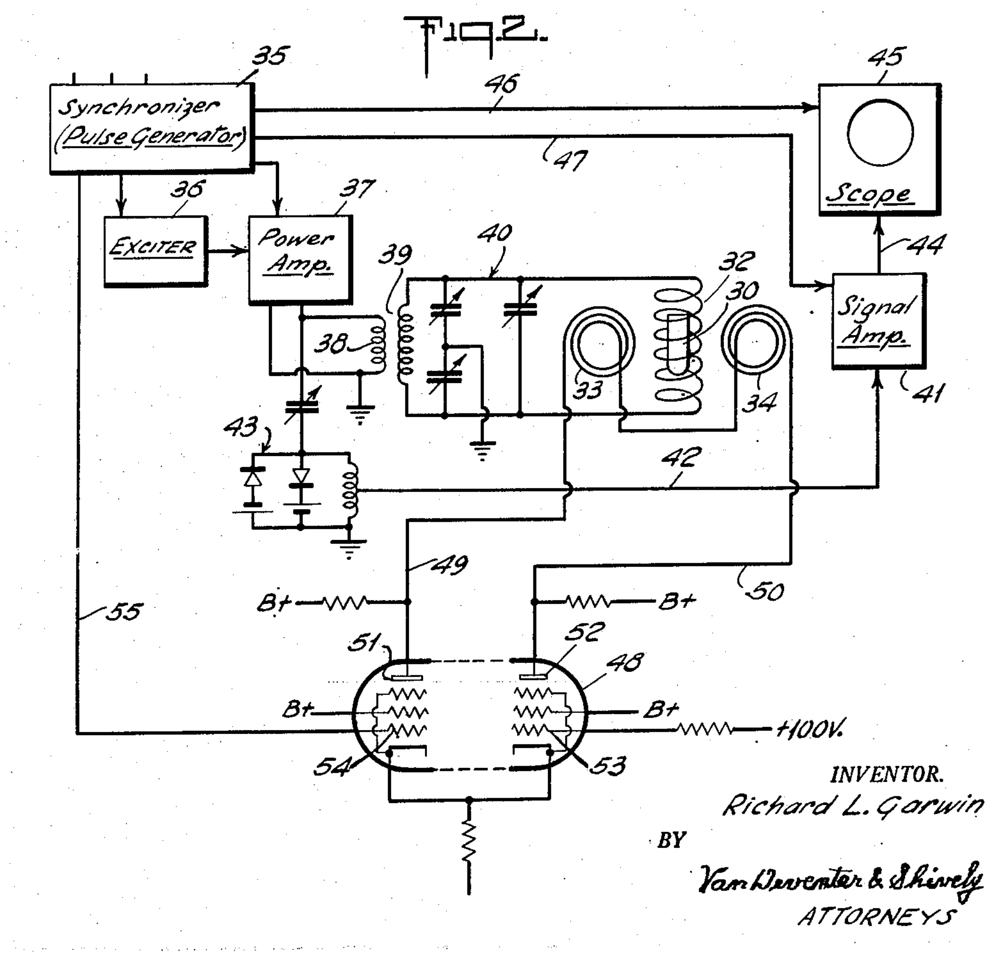

Figure 2 illustrates by semi-block diagram a typical electrical arrangement by which the impulses may be stored and echoes recovered from the sample 30. Inasmuch as the internal structures and modes of operation of the labelled block components are in general well known in the electronic art, description thereof will appropriately be limited to that necessary to explain the manner in which or with what modification they play their parts in carrying out the present invention.

A synchronizer or pulse generator 35 is adapted to originate pre-pulses, recollection pulses, and entry or storage pulses required by the system. An exciter unit 36, controllable by the pulse source 35 and comprising an oscillator and a plurality of frequency doubling stages, serves as a driving unit for the R. F power amplifier 37. In the production of a pulse the source 35 first energizes the exciter 36 to place an R. F. driving signal on the amplifier 37, then "keys" the amplifier to produce an output signal therefrom. This output is routed to a coil 38 which is inductively coupled to a second coil 39 adapted to supply energy to a circuit network 40, the latter including the previously described R. F. coil 32, Fig. 1, containing the sample 30. A signal amplifier 41 has its input conductor 42 connected to the coil 38 via a limiting network 43, so that any echo signal induced in the R. F. coil 32 and transmitted back via the coils 39 and 38 is impressed on this amplifier. The output 44 of the amplifier 41 is directed to suitable apparatus for utilization of the echo pulses, such apparatus being illustrated herein by an oscilloscope 45 provided with a horizontal sweep control connection 46 with the synchronizer 35. The amplifier 42 may also be provided with a gating connection via a conductor 47 from the sychronizer as shown, for a purpose hereinafter described.

The initial stages of spin echo technique, that is those steps dealing with the entry of information, are generally the same in prior and in the present methods, the new and advantageous features of the present invention lying in the later stages of moments control by which extraction or read-out of the entered information is effected. Referring first to Figures 3A and 3B, the entering process is as follows:

The sample first is subjected solely to the polarizing field $H_0$ for sufficient time to allow its gyromagnetic nuclei to become aligned as previously described, the resultant magnetic moment $M_0$ standing in the Z axis or field direction, as shown in dot and dash lines, Fig. 3(A). To enter information, the sample is next subjected to one or more pulses of an alternating magnetic field $H_1$ produced by R. F. alternating current in the coil 32 and hence normal to the direction of the main field $H_0$. This R. F. field, which is tuned substantially to the mean Larmor frequency of the particular storage substance in use, exerts a torque on the spinning nuclei which tips them with their composite magnetic moment $M_0$ away from the Z axis by an angle dependent on the amplitude and duration of the applied pulse. For production of a single pulse the optimum angle is 90°, that is sufficient to tip $M_0$ totally into the XY plane. For multiple pulse entry lesser angles are employed, the result of each pulse being to throw a component of $M_0$ in the XY plane, as explained in detail in the previously mentioned scientific publication and also set forth in U. S. Patent No. 2,700,147 to G. L. Tucker. Thus when multiple pulses are employed, the effect is to deposit a number of groups or "families" of related moments in the XY plane, each group being representative of its particular causitive information pulse. However, as it is impractical to depict the simultaneous behavior of a number of such "families" without confusion of detail, and as the behavior of all groups is generally the same regardless of their number, the simplest case of a single pulse is employed herein for illustration. Thus at the termination of the information pulse the composite moment vector $M_0$ lies in the XY plane as shown in Fig. 3(A).

The R. F. pulse having terminated, the moments making up the composite rector $M_0$ begin to precess in the XY plane at their characteristic Larmor frequencies. However, assuming that the field $H_0$ is not homogeneous, it will be evident that differences in field strength in various parts of the sample 30 give rise to the previously explained differential Larmor precession, so that while the group as a whole continues to rotate at a mean rate $\overline{\omega_0}$, the constituent moments of the group fan out or separate from each other at rates dependent on their particular differences in Larmor frequency. Figure 3(B), which represents a plan view of the XY plane, illustrates this fanning out process. The relatively large number of constituent vectors shown is indicative of the fact that the effects herein described are actually the composite result of the interaction of countless tiny moments. However, since it is impractical to depict this actual quantum condition, and since all the countless moments contribute to the result in the same manner, it is sufficient to continue the explanation from this point in terms of three representative moments, $M_1$, $M_2$, and $M_3$, the first rotating at the average angular velocity $\overline{\omega_0}$, the second at a lower velocity $\overline{\omega_0}-\omega_0$, and the third at a higher velocity $\overline{\omega_0}+\omega\Delta_0$.

Figures 3, 4, 5:
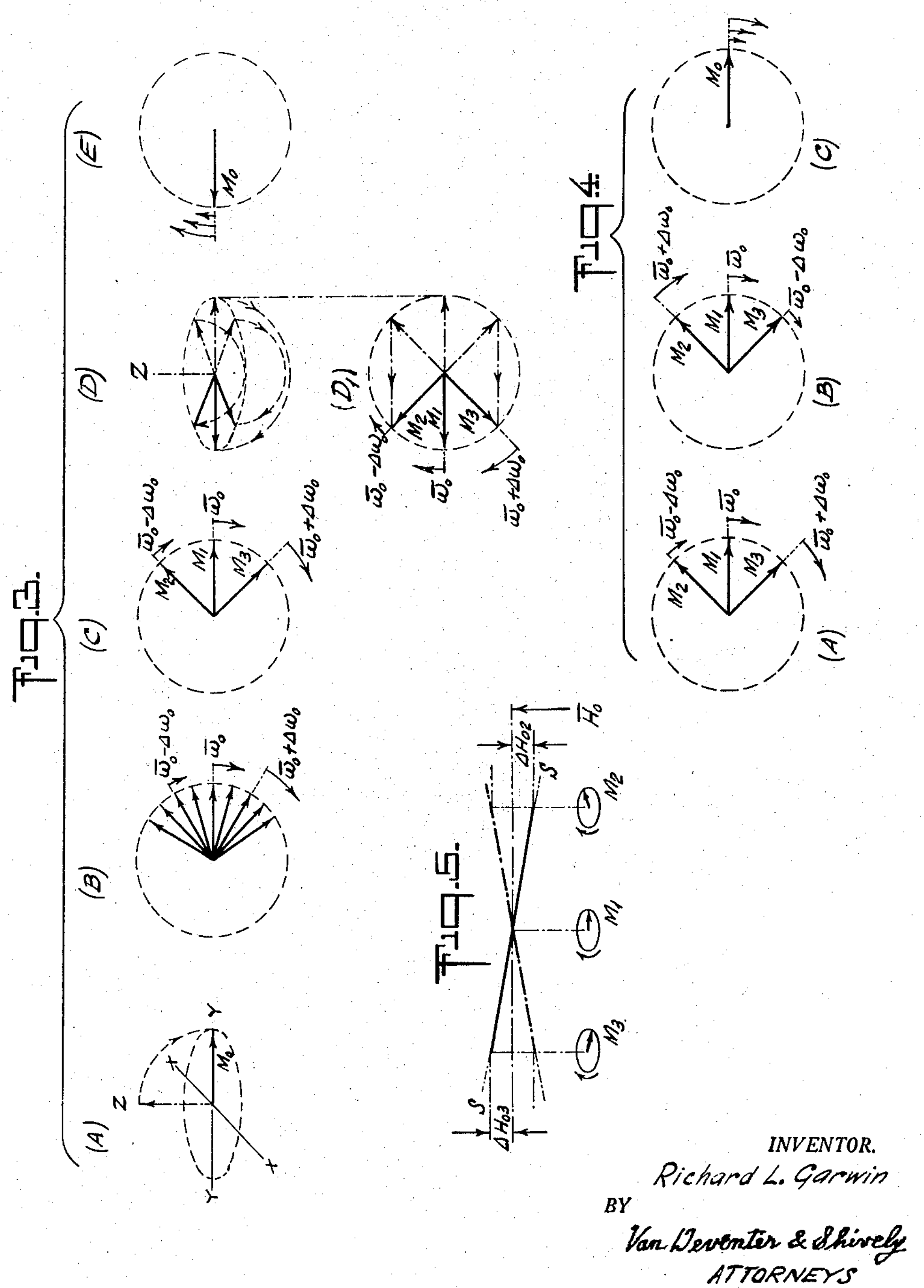
Figure 5 illustrates the manner in which reversal of the field inhomogeneity pattern affects precessing nuclei at various points in the storage medium.

At the end of a time interval $\tau$, the representative moments $M_1$, $M_2$ and $M_3$ having assumed the separated relative positions shown in Fig. 3(C), the sample 30 is subjected to a radio-frequency "recollection" pulse $P_r$ applied by the coil 32. This pulse is of sufficient amplitude and duration to tip all the rotating moments through 180° as illustrated in Fig. 3(D), i. e., the plane of rotation is flipped or "pancaked." The completion of the recollection pulse thus finds the moments $M_1$, $M_2$ and $M_3$ in the position shown in plan Fig. 3($D_1$), this position being the mirror image of that shown in Fig. 3(C), the "slow" moment $M_2$ now being ahead of average $M_1$ and the "fast" moment $M_3$ behind $M_1$. However, the angular velocities and rotational direction of all the moments remain the same as before the "flip." Therefore it will be evident that $M_1$ will eventually overtake $M_2$, while $M_3$ similarly will overtake both $M_1$ and $M_2$. Accordingly, assuming no change in the field $H_0$, at the end of a second time period $\tau$ after the recollection pulse all the constituent moments come into phase coincidence to re-form the composite moment $M_0$ as illustrated in Fig. 3(E), and as the coinciding constituents have magnetically reinforced each other, the revolving resultant $M_0$ induces a signal in the R. F. coil 32. This signal, which is the "echo" of the original input or information pulse, is transmitted via the coils 39, 38, the network 43 and the lead 42, Fig. 2, to the echo amplifier 41, where it is amplified and directed to the scope 45 or other device for utilization.

In the above explanation of the prior art it will have been noted that in order to initiate echo formation the differentially precessing moments have been removed from the XY plane and then replaced therein in opposite relative position, this removal and replacement being accomplished by the recollection pulse as shown in Fig. 3(D). It will be evident that optimum results in such a system require a high degree of precision in achieving the proper "flip" angle to ensure maximum return of the moments to the XY plane, which requirement in turn entails correspondingly accurate amplitude and duration control of the recollection pulse. It will further be obvious that for many types of service it would be highly advantageous if the above stringent requirements were eliminated. The present invention accomplishes this and related improvements by leaving the rotating moments undisturbed in the XY plane throughout the entire recall process, eliminating the R. F. recollection pulse altogether, the result being brought about in the following manner:

Fig. 4(A) represents the same moment condition as that of Fig. 3(C), the information entry and subsequent moment spreading being the same in the prior and present methods up to this point, as previously noted. Also as previously noted, the Larmor frequency $\omega_0$ of any precessing nucleus is the product of $\gamma$ and the field strength $H_0$. Thus, taking the three representative moments $M_1$, $M_2$ and $M_3$, the Larmor frequency $\bar{\omega}_0$ of $M_1=\gamma\bar{H}_0$, while for $M_2$ the frequency $\bar{\omega}-\Delta\omega_0=\gamma(\bar{H}_0-\Delta H_{02})$ and for $M_3$, $\bar{\omega}_0+\Delta\omega_0=\gamma(\bar{H}_0+\Delta H_{03})$, where $\bar{H}_0$ is the average field strength, and $\Delta H_{02}$ and $\Delta H_{03}$ are numerically equal divergences of field inhomogeneity from the average. These field conditions affecting $M_1$, $M_2$ and $M_3$ are illustrated diagrammatically in Fig. 5, in which the solid line represents the conditions applying to Fig. 4(A), $M_2$ being affected by $\bar{H}_0-\Delta H_{02}$, $M_3$ by $\bar{H}_0+\Delta H_{03}$, and $M_1$ by $\bar{H}_0$ alone, while the sloping line *s*, *s* represents the inhomogeneity gradient across the sample. If this pattern is suddenly reversed, as illustrated in the reversed slope of *s*, *s* shown in dot and dash lines, it will be evident that the field affecting $M_2$ is changed to $\bar{H}_0+\Delta H_{03}$, while $M_3$ now receives $\bar{H}_0-\Delta H_{02}$, $M_1$ remaining at the average $\bar{H}_0$ as before.

The immediate results of the described field inhomogeneity reversal appear in Fig. 4(B). $M_1$, $M_2$ and $M_3$ remain undisturbed in the XY plane and their relative rotational positions remain the same as before, but the actual speeds of $M_2$ and $M_3$ are changed. Thus the trailing formerly "slow" moment $M_2$ is speeded up to $\bar{\omega}_0+\Delta\omega_0$ while the leading formerly "fast" moment $M_3$ is slowed to $\bar{\omega}_0-\Delta\omega_0$, the speed of $M_1$ remaining unchanged at $\bar{\omega}_0$. Consequently, $M_1$ overtakes $M_3$ while $M_2$ overtakes both $M_1$ and $M_2$, the moments coming again into the phase coincidence shown in Fig. 4(C) to induce an echo signal as previously described.

The foregoing description for maximum clarity has set forth the simplest case in which the interchange of local field strengths between typical groups of nuclei in the sample takes place at one-to-one, that is in which the absolute Larmor frequencies in each group following the reversal exactly equal those of the other before the change. As will be explained hereinafter, other ratios may be employed to produce additional useful results, all however employing the same principle of reversing the inhomogeneity gradient. Typical apparatus for carrying out the method is shown in Figs. 1 and 2, as follows:

The numeral 48 designates a double pentode tube arranged as shown to provide two parallel plate circuits. The flat coils 33 and 34, which are oppositely wound, are connected via conductors 49 and 50 between the left and right hand plates 51 and 52. The right control grid 53 is held at a fixed potential, for example +100 volts as illustrated, while the left control grid 54 is connected via a lead 55 into the pulse generator or synchronizer 35.

By the above arrangement, it will be evident that so long as the grid 54 is supplied with potential just equal to that of grid 53, the two plate circuits are identically activated, so that no current flows between them through the coils 33 and 34. However, if under conrol of the synchronizer 35 the potential of grid 54 is made either greater or less than that of grid 53, the resulting inequality between the two plate circuits causes a current to flow through the coils 33 and 34, the direction of the current being dependent on the direction of potential unbalance between the control grids.

The coils 33 and 34, as shown in Figs. 1 and 2, are disposed on opposite sides of the sample 30 and with their axes parallel to the field $H_0$ of the magnet 31. Since as noted, the coils are oppositely wound, a current passing through both causes them to generate individual magnetic fields in opposite directions, one augmenting the field $H_0$ while the other subtracts from it. Assuming the normal field of the main magnet 31 to be substantially homogeneous throughout the same 30, it will be evident that the additive and subtractive fields on opposite sides of the sample cause a net inhomogeneity pattern approximating that illustrated diagramatically in Fig. 5, with resulting effect on the processing nuclei as previously described. A reversal of the coil current under control of the grid 54 interchanges the directions of the local fields set up by coils 33 and 34, thus reversing the inhomogeneity pattern as also illustrated in Fig. 5, initiating the previously explained re-assembly of the precessing constituent moments to generate the echo signal.

Figure 6:
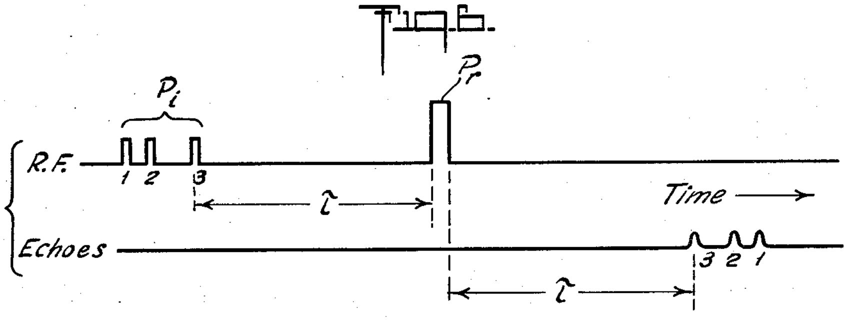
Figure 6 is a diagrammatic illustration of the sequence of electrical effects in the production of mirror echoes by a method of the prior art.
Figure 7:
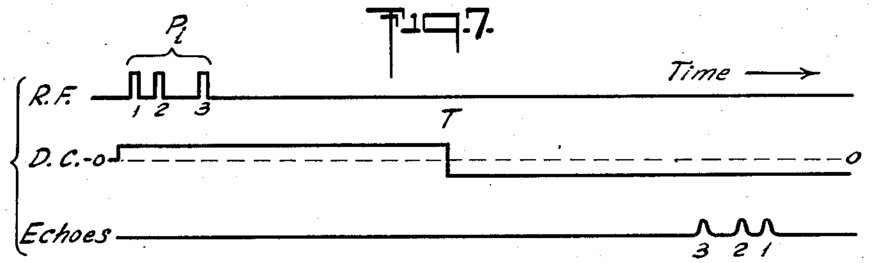
Figure 7 is a similar diagram showing a typical sequence in the present method.

Figures 6 and 7 illustrate in parallel relation the sequence of effects taking place in the generation of a typical set of three echoes by the prior and present methods respectively. Referring to Fig. 6, it will be noted that after the time $\tau$ following the last R. F. information pulse $P_i$ the relatively heavy R. F. recollection pulse $P_r$ is applied to flip the plane of the rotating moments through 180 degrees as explained regarding Fig. 3 (D). Thereafter, at the end of the second interval $\tau$ the echo signals appear in reverse or "mirror" order as indicated.

Referring now to Fig. 7, it will be noted that the application of radio-frequency occurs only in the entry of the information pulses $P_i$, the recollection pulse being eliminated. Instead, the moments remain in the XY plane and their speed relations with respect to the average are reversed by reversal of the D. C. current through the coils 33 and 34 at time T, after which the moments precess to reassembly to generate a first set of echo signals in reverse order as shown.

Figure 8:
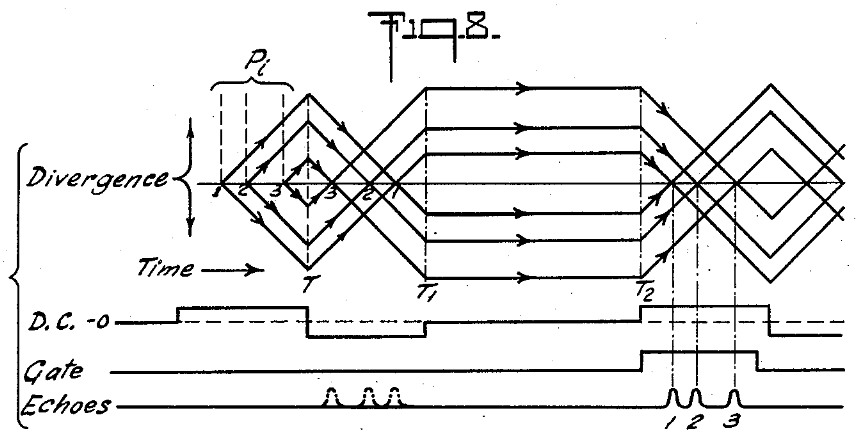
Figure 8 is a time diagram showing the divergence and convergence of related moment groups controlled by reversals of field inhomogeneity.

Figure 8 shows graphically the phase divergences and convergences taking place among the constituent moments of each information pulse group during the above described process, but also illustrates how the method of the present invention provides advantageous flexibility in timing and selective order of the echo train. In the example shown the constituent moment groups of information pulses 1, 2 and 3 diverge until time T, at which point reversal of the D. C. coil current causes them to reconverge as explained above, the resultant reversed echo signals induced in the coil 32 being illustrated in dot-and-dash lines. However, assume that the particular service in point calls for an echo output reproduced in the original order of the information pulses and at a time extended considerably beyond the typical fixed times $2\tau$ of Figs. 6 and 7. To accomplish this effect, the output amplifier 41 is first controlled via the gating connection 47, Fig. 2, so as to ignore the first set of echo pulses induced in the coil 32. Meanwhile, the constituent moments of each pulse group, having converged to form their ignored pulse, pass each other in the XY plane and rediverge or spread in reversed relative order.

At a typical time $T_1$ the D. C. coil current is reduced to zero by balancing the controls of the tube 48, thus removing the previously introduced inhomogeneity from the field $H_0$, so that all nuclei of the sample are affected by substantially the same strength of field. Under this condition all the moments continue to precess, but at substantially the same Larmor frequency, so that the constitutents of each pulse group retain their spread condition without significant convergence or further divergence. After the desired delay, for instance to time $T_2$, Fig. 8, the D. C. coil current is restored to its original "up" condition, thus recreating the field condition employed during information entry, i. e., completing a second inhomogeneity reversal. Thereupon the constituents of each group once more converge to induce echo signals in the coil 32, these signals being in reverse order of the first set and hence in the original order of the information pulses $P_1$. Since this is the desired output order as noted, the amplifier 41 is activated by the synchronizer 35 via the gating connection 42 to amplify and deliver the echo pulses to their prescribed destination.

The foregoing example illustrates time delay and selective detection in a typical combination, but it will be obvious that the method permits these factors to be introduced in a large number of variations. For example, the system may be operated with a number of successive inhomogeneity reversals within the phase memory of the sample, inducing repeated sets of echo signals alternating in reverse and direct order, from which series the amplifier may be gated to detect any chosen set, either direct or reversed in order, or any desired number of the repeated echo trains may similarly be read out.

The explanation of the new method up to this point has dealt for simplicity with field inhomogeneity reversals at one-to-one ratio, but as previously mentioned, reversals at other ratios may be used to produce further useful effects. To illustrate the manner in which such effects come about, it is appropriate to consider the angular behavior of any moment vector "*a*" subjected to respective field inhomogeneities $\Delta H_{ba}$ during divergence from and $\Delta H_{ca}$ during convergence toward the average moment vector of a related group. With divergence starting at a time $t_1$ and continuing until time $t_2$, the angle between moment "*a*" and the average vector of the group may be expressed as:

$$\psi_b=\int_{t_1}^{t_2}(\gamma(\overline{H}_0+\Delta H_{ba})-\gamma\overline{H}_0)dt=\int_{t_1}^{t_2}(\gamma\Delta H_{ba})dt \quad (1)$$

Figure 9:
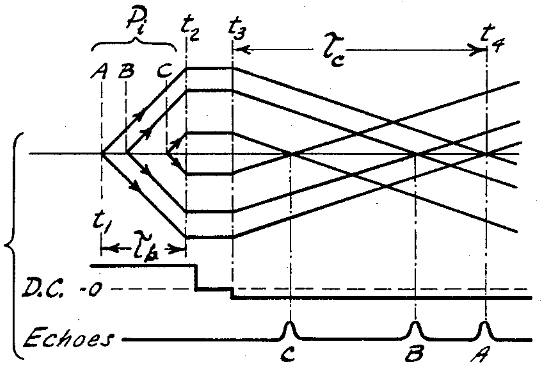
Figure 9 is a similar diagram illustrating the manner in which the present method may be employed to vary the time relation among pulses in an echo train and between the echoes and their originating entry pulses.

Assuming for simplicity a reversal of inhomogeneity at time $t_3$, Fig. 9, the convergence or decrease in angle between vector "*a*" and the average vector of the group similarly becomes $$\psi_c=\int_{t_3}^{t_4}(\gamma\overline{H}_0-\gamma(\overline{H}_0-\Delta H_{ca}))dt=\int_{t_3}^{t_4}(\gamma\Delta H_{ca})dt \quad (2)$$

For complete convergence to occur at $t_4$ it is evidently necessary that $\psi_b=\psi_c$, or $$\int_{t_1}^{t_2}(\gamma\Delta H_{ba})dt=\int_{t_3}^{t_4}(\gamma\Delta H_{ca})dt \quad (3)$$

While in the completely general case both $\Delta H_{ba}$ and $\Delta H_{ca}$ may themselves be variables as functions of time during divergence and convergence respectively, the most useful case under consideration occurs when these inhomogeneities, as determined by the corresponding D. C. coil current, Fig. 9, remain constant throughout their respective operating time periods. Under these conditions, by integrating both sides of Equation 3 and eliminating the common factor $\gamma$, the criterion for coincidence at $t_4$ becomes $$\frac{\Delta H_{ba}}{\Delta H_{ca}}=\frac{t_4-t_3}{t_2-t_1}=\frac{\tau_c}{\tau_b} \quad (4)$$

Equation 4 will be seen to state that under the conditions noted, the ratio of the convergence time to the divergence time is the inverse ratio of the corresponding field inhomogeneities. Considering that within the relatively small inhomogeneity range required in practice the ratio $$\frac{\Delta H_{ba}}{\Delta H_{ca}}$$

may be held substantially uniform throughout the sample 30, it will thus be evident that an echo of a given information pulse may be made to appear following field reversal by a time period $\tau_c$ less than, equal to or greater than the divergence time $\tau_b$ simply by proper selective control of the D. C. currents through the coils 33 and 34. Figure 9 illustrates this effect, showing as example a case in which $\tau_c$ for echo "A" is considerably longer than the $\tau_b$ following the corresponding information pulse. It will further be evident that as the moment groups of the other information pulses are subjected to the same reversal ratio of field inhomogeneities, the time intervals between successive echoes may similarly be made less than, equal to or greater than the corresponding times between information pulses. Also, as illustrated in Fig. 9, any desired time delay, such as the interval between $t_2$ and $t_3$, may be introduced at any point in the memory process by reducing the field inhomogeneity substantially to zero as previously explained, so that the absolute times of echo production and their relative timing may be varied separately or in conjunction.

Such a time delay may even be introduced during rather than at the beginning or end of a major divergence or convergence period, for such purposes as introducing an arbitrary delay between selected echoes of a train or for eliminating certain selected echoes altogether. In such a case the effect is to render the factors $\Delta H_{ba}$ and $\Delta H_{ca}$ variable functions of time, in Equations 1, 2 and 3 as previously mentioned, adding a corresponding amount of mathematical complication to the solution of Equation 3 but in no way affecting its validity. With respect to Equations 1 and 2, it will have been noted that they apply in the same manner to all moment vectors of a group whether initially "faster" or "slower" than the average, the only difference appearing in the absolute signs of both integrals. Thus for a "fast" vector both sides of Equation 3 are positive, while for a "slow" vector both sides of Equation 3 will have negative signs which mutually cancel.

For simplicity Fig. 9 shows the feature of variable inter-echo timing as applied to the first set of echo pulses which occur in reverse order, but obviously the process may employ multiple convergences with selective read-out as illustrated in Fig. 8, which latter figure actually represents a special case of the general method in that its inhomogeneity reversal ratio of Equation 4 is taken therein as unity.

From the foregoing description it is believed evident that the present invention presents a spin echo technique of great variety and flexibility of application, the original moment groups originally deposited in the XY plane remaining therein undisturbed by torsional R. F. "recollection" pulses but instead being relatively speeded up and slowed down to echo-forming convergences in number and time sequences limited only by the available "phase memory" time of the particular storage medium in use, all effects being normally controlled by the relatively small D. C. currents through the magnets 33 and 34 and, if desired, the described gating of the amplifier 41.

The examples set forth are typical of the many useful effects made possible but it will of course be obvious that the practice of the invention necessarily contemplates some additional variations from the exact relationships and apparatus illustrated. For example, as previously stated, the optimum normal field condition of the main magnet 31 is that of substantially zero inhomogeneity throughout the sample 30, with the accompanying normally zero D. C. current through the coils 33 and 34 as illustrated in Fig. 7. However, in some cases a deviation from zero homogeneity in a particular magnet 31 may be corrected by use of a trickle current in the appropriate direction through the coils 33 and 34. For the same purpose, additional small trimming or correctional magnetic members may be arranged about the region of the sample in a manner roughly analogous to the correction of a mariner's compass. In other words, while the invention has been set forth in preferred form it is not limited to the exact procedures and apparatus illustrated, as various modifications may be made without departing from the scope of the appended claims. As a further example, while for simplicity the explanation has been carried through for variation of the magnetic inhomogeneity by a proportional reversal of the spatial pattern respecting the sample with the magnetic field at the sample center remaining constant in time, clearly the apparatus may be arranged to accomplish the reversal with the field at the edge of the sample remaining constant, or with the field nowhere remaining constant in the sample but with the inhomogeneous part being proportionally reversed therein. Such reversals with average value not zero may be made to produce the same echo timing, but with a different carrier or mean Larmor frequency level. Thus a means of frequency translation at inversion is available.

I claim:

1. In spin echo apparatus for storing information in and extracting said information from gyromagnetic particles of a sample of chemical substance, means to establish a polarizing field having a pattern of inhomogeneity in an initial spatial relationship to said sample, means to establish an informational combination of magnetic moments of said particles in phase divergent precessional disassembly in a plane normal to the direction of said polarizing field, and means to convert said phase divergent precession to phase convergent precession while retaining said moments continuously in said normal plane, whereby said moments may re-assemble to mutual magnetic pulse-forming reinforcement in said plane.

2. Apparatus according to claim 1 wherein said converting means includes means to reverse said pattern in spatial relationship to said sample.

3. In spin echo apparatus for information storage in and extraction from gyromagnetic particles of a sample of chemical substance in a polarizing field during an information pulse storing period and an echo pulse producing period respectively, means to provide an initial pattern of inhomogeneity of said field in said sample throughout said storage period, and means to substantially remove said inhomogeneity, and to establish a second inhomogeneity pattern substantially proportional to said first pattern in reverse spatial relationship to said sample for initiating said echo pulse producing period.

4. In spin echo memory apparatus for extracting stored information from an informational grouping of magnetic moments of gyromagnetic nuclei precessing in phase-divergent relation from initial coincidence in a pre-determined plane, means to proportionally reverse the rotative speed relationships among said moments while retaining their prior positional relationship continuously in said plane, whereby said moments may subsequently converge to form an echo signal, and means to detect said echo signal.

5. In spin echo memory apparatus for extracting stored information from an informational grouping of magnetic moments rotating in phase-divergent relation from initial coincidence, means to reverse the rotative speed relationships among said moments while retaining their prior rotational positional relationships, whereby said moments may converge to generate an echo signal, and means to detect said echo signal.

6. In spin echo memory apparatus, in combination, a sample of chemical substance, means to establish a substantially homogeneous polarizing magnetic field throughout said sample, means to produce a pattern of inhomogeneity in said field affecting said sample, and means to control said pattern-producing means to effect substantially proportional reversal of the spatial relationship of said pattern to said sample.

References Cited in the file of this patent

UNITED STATES PATENTS

| | | |
|---|---|---|
| 2,700,147 | Tucker | Jan. 18, 1955 |
| 2,718,629 | Anderson et al. | Sept. 20, 1955 |